United States Patent [19]

Schmidt

[11] Patent Number: 5,793,420
[45] Date of Patent: *Aug. 11, 1998

[54] VIDEO RECORDING SYSTEM FOR VEHICLE

[76] Inventor: William P. Schmidt, 21821 Woodruff, Rockwood, Mich. 48173

[*] Notice: The term of this patent shall not extend beyond the expiration date of Pat. No. 5,570,127.

[21] Appl. No.: 603,464

[22] Filed: Feb. 20, 1996

Related U.S. Application Data

[63] Continuation-in-part of Ser. No. 330,976, Oct. 28, 1994, Pat. No. 5,570,127.

[51] Int. Cl.$^6$ .................................................. H04N 5/225
[52] U.S. Cl. .......................... 348/148; 348/151; 340/433
[58] Field of Search .................................. 348/148, 149, 348/143, 151, 159; 340/433

[56] References Cited

U.S. PATENT DOCUMENTS

4,943,864  7/1990  Elberbaum ............................ 348/159
5,027,200  6/1991  Petrossian et al. .................... 348/149
5,289,321  2/1994  Secor ..................................... 348/149
5,319,394  6/1994  Dukek .................................... 348/148
5,382,953  1/1995  Hauptli .................................. 340/433
5,455,561  10/1995 Brown ................................... 348/154
5,517,236  5/1996  Sergeant et al. ...................... 348/143
5,570,127  10/1996 Schmidt ................................. 348/148

Primary Examiner—Wendy Garber
Attorney, Agent, or Firm—Weintraub & Brady

[57] ABSTRACT

A vehicle video system including at least three video cameras electrically connected to a video signal relay device which directs video signals generated by each of the video cameras to either a video recorder or a monitor depending upon switching signals received to the video signal relay device. A video camera is automatically triggered to commence recording upon activation of a turn signal of a vehicle on which the system is deployed. A motion detector deployed on one vehicle can trigger a video camera deployed on another vehicle to commence recording. The system draws power from a battery of the vehicle.

11 Claims, 4 Drawing Sheets

VIDEO RECORDING SYSTEM FOR VEHICLE

This application is a Continuation-in-part application of U.S. patent application Ser. No. 08/330,976 filed on Sep. 28, 1994, now U.S. Pat. No. 5,570,127 entitled VIDEO RECORDING SYSTEM FOR PASSENGER VEHICLE which is incorporated herein by reference.

BACKGROUND OF THE INVENTION

I. Field of the Invention

The present invention relates, generally, to video recording and display systems. More particularly, the present invention relates to a video recording and display system for use in a passenger vehicle.

II. Description of the Prior Art

Passenger vehicles, such as school buses can present a very dangerous environment for its passengers. Generally, a single bus driver is placed in charge of all the students riding the bus. The bus driver is not only burdened with the job of safely driving the bus, but also managing students riding to and from school.

Because school bus drivers cannot continuously watch the students, they frequently act inappropriately without the bus driver taking notice and without the ability to do anything about it. For example, students often place themselves in danger by standing up while the bus is in motion, throwing various items, etc. Concomitantly, students are exposed to the danger of passing traffic every time they board and exit a school bus.

Currently equipped school buses generally include large red lights prominently displayed exteriorly at the front and rear of the bus. When students are boarding or exiting the bus, the bus driver activates a switch, causing the lights to blink on and off. By law, in most jurisdictions, motorists are required to stop and wait until the bus driver turns off the flashing lights, ensuring the students' safety. Unfortunately, motorists often fail to notice the flashing stop lights or simply ignore them and drive past the school bus while students are boarding or exiting. Bus drivers are in no position to record license plate numbers or descriptions of vehicles passing the bus while it is stopped to load or unload students, so motorists continue breaking the law with very little chance of being caught. Bus drivers simply cannot effectively carry out three jobs at once; i.e. drive the bus, manage the students and record the license plate numbers of motorists who pass the bus while it is loading or unloading students.

Additionally, it is to be appreciated that busses, as well as other passenger vehicles, are often vandalized. Currently, there exists no system to videotape acts of vandalism committed on or to a vehicle. Also, school buses, as well as other vehicles such as trucks and boats all have areas adjacent to the vehicle which are not viewable by the driver of the vehicle when they look into a rear view mirror mounted to the vehicle, i.e. blind spots. This presents serious safety hazards not only to the driver and his passengers, but also to other motorists and pedestrians who are located proximate the vehicle.

What is needed in the art is a video system that provides means for viewing the blind spots of a vehicle, means for deterring passengers inappropriate behavior and motorists' unlawful behavior, as well as deterring vandalism. It is to the above-mentioned problems which the present invention is directed.

SUMMARY OF THE INVENTION

The present invention provides a passenger vehicle video recording system comprising:

(a) a plurality of video cameras attached to a passenger vehicle for viewing traffic approaching and passing the vehicle, each of the plurality of video cameras comprising:
  (1) a lens;
  (2) means for generating video signals representing an image received through the lens;
  (3) means for outputting the video signals;
(b) a video recorder located inside the passenger vehicle, the video recorder having a video signal input port;
(c) means for displaying images represented by video signals; and
(d) a video signal relay device in electrical communication with the means for outputting the video signals of each of the plurality of video cameras, the video signal relay device additionally in electrical communication with the video signal input port of the video recorder and the means for displaying images represented by video signals.

The present invention, as implemented in a school bus, includes at least three video cameras. Two cameras are mounted to the outside of the bus, being attached at the driver's side of the bus and the side opposite the driver's side of the bus. The third camera is attached inside the bus and may be mounted to the rear view mirror. The cameras located outside the bus view an area where traffic approaches and passes the bus. The camera located inside the bus views the passenger compartment therein. Each of the cameras is connected to a switching device that relays video signals from one of the cameras to a video recorder or display device such as a monitor located inside the bus. The switching device is connected to each of the cameras and to the video recorder as well as a display monitor. When the flashing light system of the bus or another system such as an alarm system or the turning light system is activated, video signals representing images captured by one of the cameras mounted to the exterior of the bus are relayed to the video recorder and/or display screen for viewing by the driver. When the flashing light system is deactivated, video signals representing images captured by the camera mounted inside the school bus may be relayed to the video recorder.

Additionally, the present invention may include an override switch wherein the driver of the vehicle may record images captured by the camera mounted interiorly the vehicle regardless of the activation of the flashing light system.

The present invention will be more clearly understood with reference to the accompanying drawings. Throughout the various figures, like reference numerals refer to like parts in which:

DETAILED DESCRIPTION OF THE PREFERRED EMBODIMENT

Figure 1:
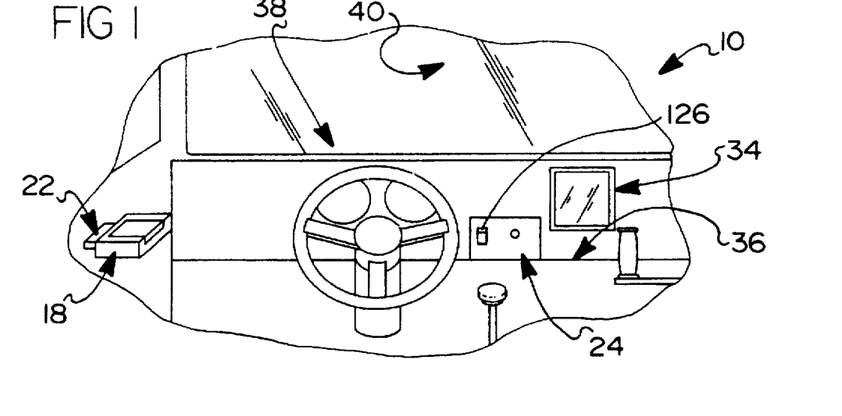
FIG. 1 is a partial environmental plan view depicting the preferred embodiment of the passenger vehicle video system as implemented in a school bus.
Figure 2:
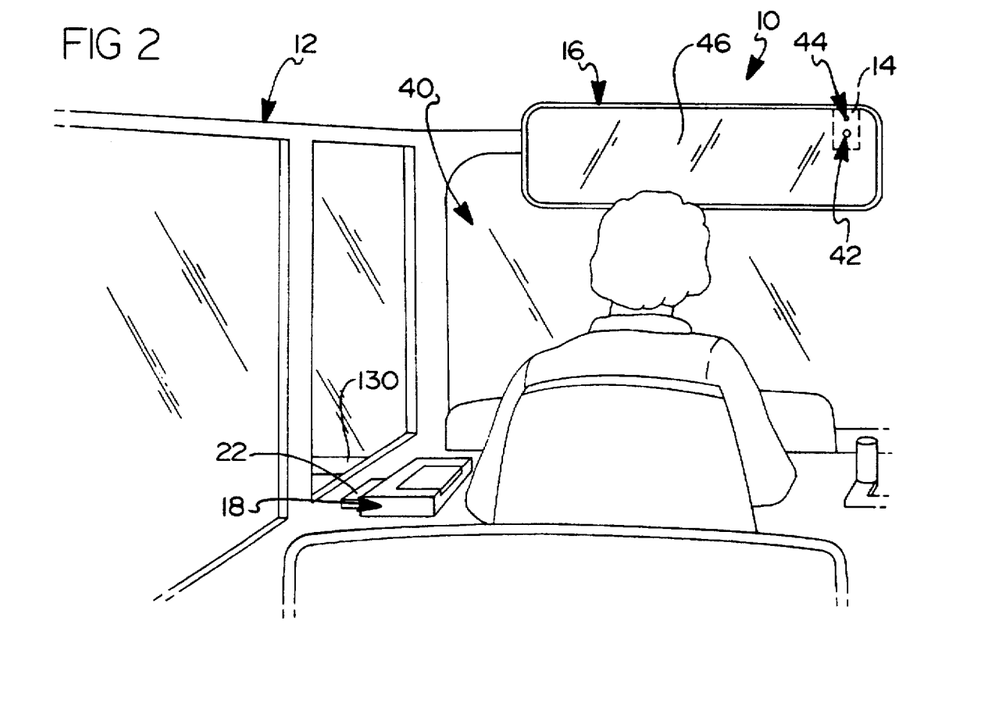
FIG. 2 is a partial environmental view depicting the preferred embodiment of the passenger vehicle video system as implemented in a school bus.
Figure 3:
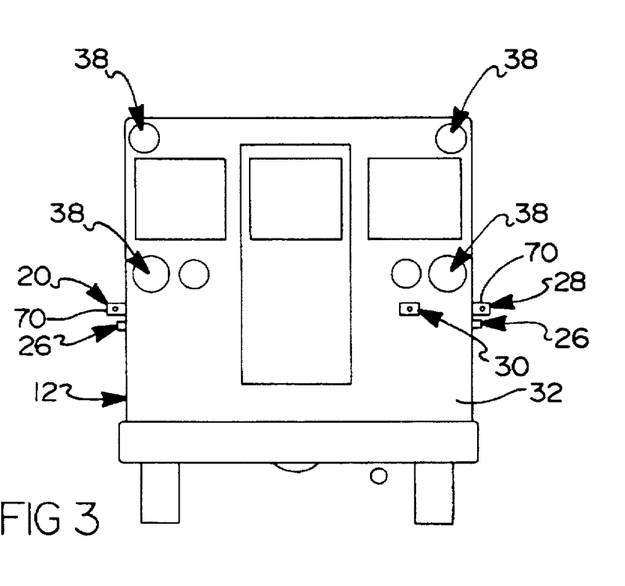
FIG. 3 is an external environmental view of the preferred embodiment of the passenger vehicle video system as implemental in a school bus.

Referring now to FIGS. 1, 2 and 3 there is shown a preferred embodiment of the present invention, to wit, a passenger vehicle video recording/display system shown generally at 10 and optimally, deployed in conjunction with a school bus 12. It is to be appreciated that the passenger vehicle video recording/display system may be implemented in any passenger vehicle including, but not limited to automobiles, travel trailers, busses, and boats.

The system 10 generally comprises a first camera 14 mounted to a vehicular rearview mirror 16, a video recording device 18, a second camera 20 externally mounted to the school bus 12 at the driver's side, a video signal relay device 22, a video control panel 24 mounted to the dash board of the bus 12, a plurality of motion detectors 26 mounted to the bus 12, a third camera 28 mounted to the exterior of the bus 12 at the side opposite the driver's side of the bus 12, as well as a fourth camera 30 mounted to the rear 32 of the bus 12.

The bus 12 includes stop lights 38 that flash on and off when activated by the bus driver. These stop lights 38 indicate to passing vehicles that students are loading onto or unloading off of the bus 12 and that the vehicle should stop until the flashing stop lights 38 are deactivated. The flashing stop lights 38 may be positioned at the front and rear of the bus 12 as well as on the sides of bus 12.

Additionally, the preferred embodiment of the present invention includes a display screen 34 removably mounted to the interior of the bus 12 in a position where the driver may view the display screen as he is driving the bus 12. As such, and as is known in the art, the display may be a heads up display where images are projected onto the windshield of the vehicle. The display screen 34 is essentially a television monitor and as such is well-known. Such monitors are produced by the Sony, Mitsubishi, and Zenith companies as well as a host of other electronics companies and essentially any one of them may be utilized in this system 10. The display screen 34 should be small enough to seat on the dash board 36 of the vehicle. The display screen 34 may be removably and rotatively mounted to the dash board 36 via screws, clamps, swivel brackets, or some other well known means for mounting.

Alternatively, the display screen 34 may be mounted to the vehicle at its front window 40. Of course, the display screen 34 must be mounted thereto so as not to interfere with the line of sight of the driver. The display screen may be mounted to the front window 40 with suction cups, brackets, glue or other well-known means for mounting.

Figure 4:
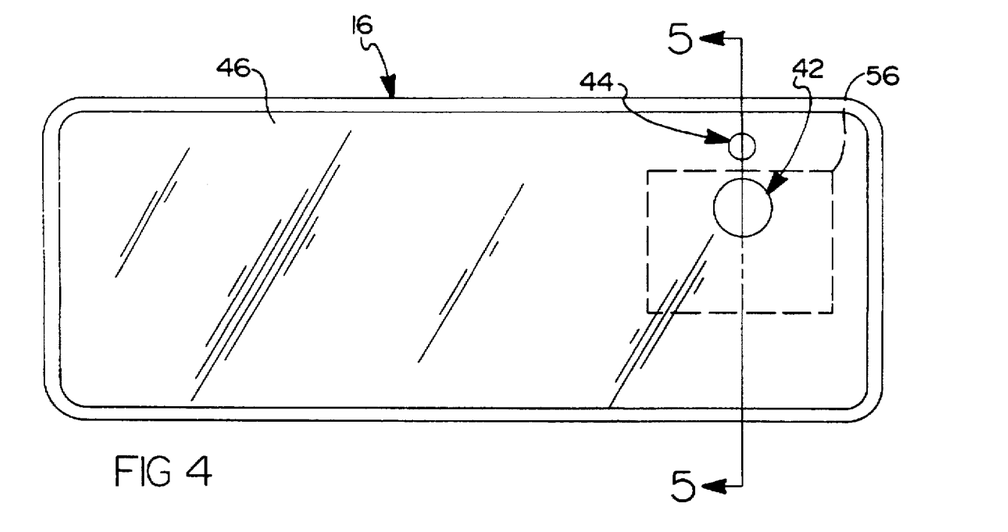
FIG. 4 is a front view of a mirror having a video camera mounted thereon in accordance with the present invention.
Figure 5:
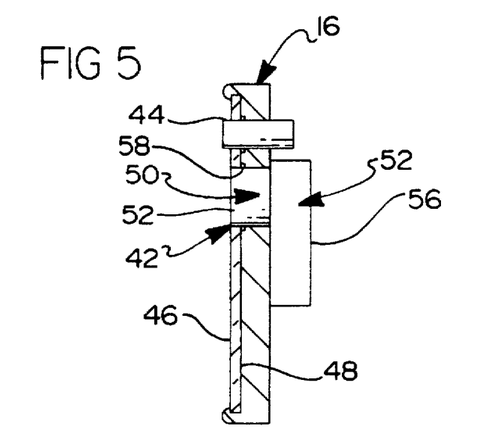
FIG. 5 is a cross-sectional view of the mirror, taken along the line 5—5 of FIG. 4.

As depicted in FIGS. 2, 4 and 5, the rearview mirror 16 is shown as a rectangular, flat mirror, but may also be any type of rearview mirror known to the skilled artisan. The mirror 16 includes a first aperture 42, a second aperture 44, a front surface 46, and a rear reflective surface 48.

The first video camera 14 is mounted to the rearview mirror 16 at its rear reflective surface 48 by mounting brackets, glue, or other means for mounting known to the skilled artisan. The first video camera 14 has a front portion 50 and a rear portion 52. The front portion 50 of the first camera 14 includes a camera lens 60. The rear portion 52 of the first camera 14 includes means for generating video signals representing an image received through the lens. Such means for generating video signals indicative of an image received through a lens are well known to the skilled artisan and come as part of currently produced video cameras. Additionally, the rear portion 52 includes means for outputting the video signals 54. Such means for outputting video signals are well known to the skilled artisan, such as an output port, wiring, output plug transmitter or other similar means.

The first video camera 14 is preferably enclosed in a housing 56 which fits about the first camera 14 and is mounted to the rear portion 52 of the mirror 16 using mounting brackets, screws, welding or other conventional means for mounting. In this way, passengers do not know that there is a camera mounted to the mirror. Additionally, the camera 16 is stabilized using the same stabilizing mechanisms incorporated in the mirror 16.

The front portion 50 of the first camera 14 slidably seats in the first aperture 42 of the rearview mirror 16. A gasket 58 securely fits about the periphery of the front portion 50 of the first camera 14 to seal the opening between the first aperture 42 and the front portion 50 of the first camera 14. Also, the gasket 58 provides for vibration dampening between the mirror 16 and the front portion 50 of the first camera 14. This helps to steady the front portion 50 of the first video camera 14 as the passenger vehicle travels over different types of terrain. The lens 60 of the first video camera 14 is trained on images in the vehicle. Additionally, the lens 60 is flush with the front surface 46 of the rearview mirror 16 protecting and reducing any additional vibrations of the lens 60.

Alternatively, the first camera 14 may be mounted to the rear reflective surface 48 of the mirror 16 so that the lens 60 is flush with the rear reflective surface 48. The lens 60 is able to view the passenger compartment because no reflective surface is applied or included where the lens 60 meets the mirror 16. The reflective surface has been purposely left off in that area so that the lens 60 may view through the mirror.

A first light emitting diode 62 has a front portion 64 and a rear portion 66. The first light emitting diode 62 is mounted to the mirror 16 using a mounting bracket, glue, or other means for mounting well known to the skilled artisan. The light emitting diode 62 slidably seats in the second aperture 44 of the rearview mirror 16. A second gasket 68 securely fits about the periphery of the front portion 64 of the first light emitting diode 62. The second gasket 68 secures the first light emitting diode 62 within the second aperture 44 of the rearview mirror 16. Further, the second gasket 68 seals the opening between the second aperture 44 of the rearview mirror 16 and the periphery of the front portion 64 of the first light emitting diode 62.

The first light emitting diode 62 is electrically connected to the first video camera 14 and is lit when the first video camera 14 is active. Means for electrically connecting a light emitting diode to a video camera are well known to the skilled artisan, such as wire, coaxial cable or other means for electrical connection. Students riding the bus, or passengers in the vehicle, can see the first light emitting diode 62 and know the first camera 14 is active when the first light emitting diode 62 is lit.

Figure 6:
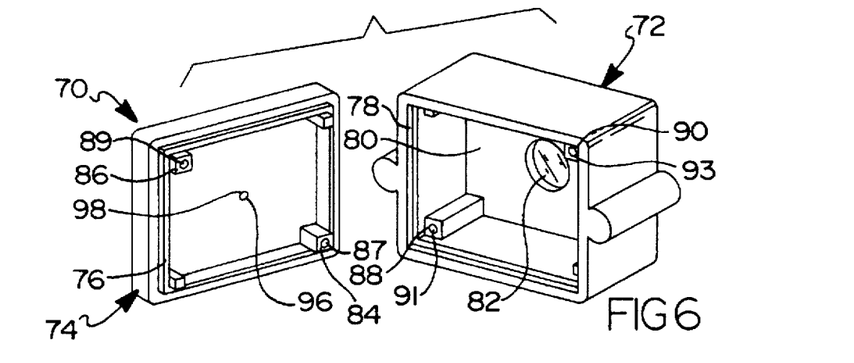
FIG. 6 is an exploded view of the external mounting box of the preferred embodiment.

Referring now to FIGS. 3 and 6, there is shown the second video camera 20 mounted to the driver's side of the bus 12.

The third video camera 28 is mounted to the side opposite the driver's side of the bus and the fourth video camera 30 is preferably mounted to the rear 32 of the bus. It is to be appreciated that the exact locations of the second, third and fourth video cameras 20, 28, and 30 are not essential to the functioning of the system. However, each of the cameras may be positioned so that they face rearwardly of the bus 12 in order to capture images which would normally not appear in the rearview mirrors of the bus 12. The cameras may additionally face forwardly to capture the license plate numbers of passing vehicles.

Each of the second, third and fourth video cameras 20, 28, 30 is housed within a mounting box 70. Each mounting box 70 is substantially identical and preferably constructed of some, non-corrosive, durable material such as plastic, zinc plated steel, or the like.

As each of the mounting boxes utilized to contain the second, third and fourth cameras 20, 28 and 30 are substantially identical, the specific elements of the mounting boxes will be disclosed using as an example the mounting box 70.

The mounting box 70 has a front portion 72 and a rear portion 74. The rear portion 74 includes a shoulder 76 which peripherally extends thereabout. The shoulder 76 is slidably received by an indent 78 included in the front portion 72. An O-ring 78 is disposed about the shoulder 76 to provide a means for environmentally sealing the mounting box 70 when it is assembled.

Additionally, the front portion 72 includes a front wall 80. A portion of the front wall 80 is ground to define a lens 82 therein. This serves as a "fish-eye" lens 82 in the front wall of the mounting box. As such, a larger area may be viewed by the video camera housed within the mounting box 70.

Because a video camera must be able to view images through the front wall 80 of the mounting box, the front wall must be "see-through", formed from plastic or the like. Alternatively, the lens 82 itself be formed from a see-through material while the rest of the mounting box 70 may be formed from a non-see through material.

A small, well-known video camera, such as one of those produced by the Sony, Sanyo, or Matsushita companies sealably seats in the mounting box 70 and is environmentally sealed therein. To ensure proper sealing, both the front portion 72 and the rear portion 74 include corner posts 84, 86, 88, 90. Each of the corner posts has a channel 87, 89, 91, 93 formed therein.

Small rods 92, 94 are then slidably seated in corresponding corner posts 86, 90 and 84, 88. The rods 92, 94 may be formed of plastic or some other durable material and serve to ensure a proper fit between the front portion 72 and the rear portion 74. The rods 92, 94 may be threaded and concomitantly the channels 87, 89, 91, and 93 should be threaded to threadably receive the rods 92, 94.

The rear portion additionally includes a small aperture 96 formed therethrough. Leads or wires from a video camera housed within the mounting box 70 exit the mounting box 70 through this aperture 96. A gasket 98 seats peripherally about the leads where they pass through the aperture 96 effectively environmentally sealing the opening. The function of the leads or wires will be explained in more detail hereinbelow.

The second, third and fourth video cameras 20, 28, 30 each include means for generating video signals indicative of an image captured by lens of the video camera. Additionally, each of the cameras 20, 28, 30 includes means for outputting the video signals 100. Preferably, such means for outputting video signals includes wires or radio frequency transmitters.

The plurality of detectors 26 are preferably mounted to the exterior of the bus 12 so that when activated, any motion occurring or heat detected around the bus is detected by at least one of the plurality of detectors 26. The detectors 26 may be well-known motion detectors, or infrared detectors. Each of the plurality of detectors 26 includes an output port 114 which is preferably a wire or radio frequency transmitter. Motion detectors which incorporate output ports are well known such as those produced by the Stanley company.

The detectors 26 function to recognize when someone, such as a vandal, is in the proximity of the vehicle. More particularly, in the case of school buses, after they are parked for the night, the detectors may be activated via a switch located on the control panel 24 in the bus 12. The detectors draw very little energy and as such may be connected to the electrical system of the bus (not shown). Alternatively, a separate power source, such as another battery may be supplied to power the detectors when is use.

Figure 7:
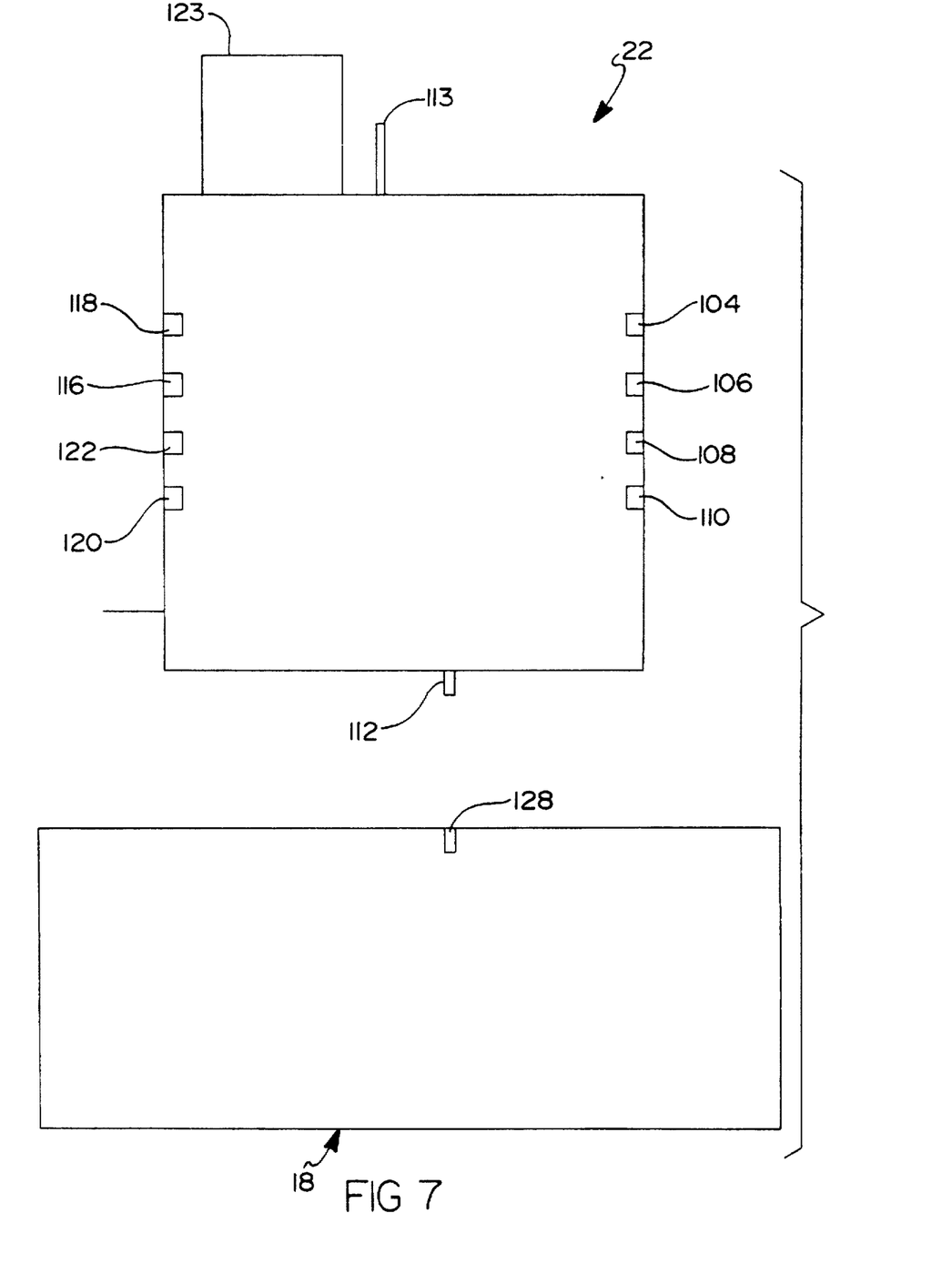
FIG. 7 is a top view of the video signal relay device and video recorder in accordance with the present invention.

Included in the preferred embodiment and as depicted in FIG. 7, the present invention includes a selective video signal relay device 22 in conjunction with the video recording device 18 and the display screen 34.

The selective video signal relay device 22, includes four video signal input ports 104, 106, 108, 110. A video output plug 112, a display output plug 113, a switching signal input port 116, a detector switch port 118, a turn signal switch port 120, and an override switch port 122, as well as means for transmitting and receiving RF signals 123. Other transmittable signals may be used instead of RF signals. Each of the four video signal input ports 104, 106, 108, 110 is electrically connected to a corresponding means for outputting video signals of the first video camera 14, the second video camera 20, the third video camera 28 and the fourth video camera 30. The selective video signal relay device 22 functions by relaying only one of the four video signals received at the video signal input ports 104, 106, 107, 110 to the video output plug 112 and the display output plug 113, depending upon signals received at the detector switch port 118, the turn switch port 120, the override switch port 122 and the switching signal input port 116.

The means for switching disposed within the selective video signal relay device 22 may be accomplished by integrated circuit technology, relay circuitry or other relay means, all of which are well known to the skilled artisan. The functioning of the video signal relay device is described in detail hereinbelow.

The output plug 112 of the video signal relay device 22 is electrically connected to the video recording device 18 at a video input port 124 thereof.

A commercially available video recorder may be used as all currently produced video recorders include video signal input ports. In the preferred embodiment, the video recording device 18 and the four cameras 14, 20, 28, 30 are activated when the vehicle is started. This can be accomplished by connecting the video recording device 18 and the four cameras 14, 20, 28 and 30 to the electrical system (not shown) of the passenger vehicle 12. Alternatively, the video recording device 18 and video cameras 14, 20, 28, and 30 may be battery powered. A transformer may be required to convert the electric current supplied by the electrical system of the vehicle to correspond to the current required by lack of the cameras and the video recorder (i.e. AC/DC converter and 12V to 120V converter).

Means for connecting loads, such as a video recorder and video cameras, to a passenger vehicle's electrical system are well know to the skilled artisan including wiring and coaxial cabling and will not be further discussed herein. The three externally located cameras 20, 28, and 30 each include a power line (not shown) which feeds though the aperture 96 along with the means for outputting video signals 100, both of which are preferably wires which then pass through an aperture drilled through the wall of the bus 12. Other methods for electrically connecting the externally located video cameras to a power source may be used as well. The means for outputting video signals 54 and 100 which run from each of the cameras 14, 20, 28, and 30 are connected to one of the input ports of the video signal relay device 22. Preferably this is accomplished using environmentally sealed and shielded wiring to ensure a good signal, i.e. a clear picture.

The video recording device 16 records the images relayed from one of the four cameras 14, 20, 28, 30 in accordance with signals received at its switching signal input port 116, motion detector input port 188, turns signal input port 120, or the override port 122.

The selective video signal relay device 22 generally functions in response to a switching signal received at the switching signal input port 188. In the preferred embodiment, the switching signal will have only two states; one state indicating that the flashing stop lights 38 are activated; the other state indicating that the flashing stop lights 38 are deactivated.

When the flashing stop lights 38 are activated, the selective signal relay device 22 receives a corresponding switching signal and relays the video signals received from the second video camera 20 to the input port 124 of the video recording device 18. If the flashing stop lights 38 are deactivated, the video signal relay device 22 receives a different switching signal and, accordingly, relays the video signals received from the first video camera 14 to the input port of the video recording device 18.

Although the selective video signal relay device 22 is pictured as having input ports 104, 106, 108, 110, any means for receiving electrical signals could be used including direct wiring between the video signal relay device 22 and the video cameras as well as other means known to the skilled artisan. However, to ease production of the system it is envisioned that the input ports 104, 106, 108, 110 receive plugs attached to cables leading to the means for outputting video signals of the video cameras 14, 20, 28, and 30.

The switching signal received at the switching port 116 of the selective video signal relay device 22 may be produced by any of a multitude of well known means including, but not limited to, pulse width modulation, step voltages, or multiplexed signals, all of which are known to the skilled artisan.

The means for producing the switching signal may function jointly with the means for activating the flashing stop lights 38. The flashing stop lights 38 may be activated by pushing a button (not shown) located near the driver's seat of the passenger vehicle. When the push button or other suitable means for activating the flashing stop lights 38 is activated, a corresponding switching signal is sent to the switching signal input port 116. The signal may be produced by the same circuit that relays power to the flashing stop lights 38 or from another source such as directly from the battery of the vehicle (not shown).

In normal operation, the video recorder 18 records the images received from the first video camera 14, as relayed by the video signal relay device 22. When the driver of the passenger vehicle activates the flashing stop lights 38, the selective video signal relay device 22 receives a different switching signal and accordingly relays the video signals from the second video camera 20 to the video recorder 16. The driver may override the connection by pushing the override switch 126 on the control panel 24. By pressing the override switch 126 a signal is sent to the override port 122 which then relays video signals from the first camera 14 to the video recording device 18. In this fashion, if a bus driver sees someone acting inappropriately on the passenger vehicle 12 he can video record the passenger even if the flashing lights 38 on the vehicle are activated. He can do this by simply pressing the override switch 126.

Each of the plurality of motion detectors are wired parallely to the motion detector port 188 of the video signal relay device. The detectors may be activated while the vehicle is not in operation. They are preferably utilized to detect motion or heat about the vehicle. If any motion or heat indicative of a human is detected, a switch (not pictured) may be tripped which then connects the power supply, either the vehicle's battery or another battery supplied for such a purpose to the cameras and the video recording device 18.

The system 10 is powered up upon the detection of motion or heat by one of the plurality of detectors 26 and a signal is sent to the motion detector port 118 of the video signal relay device 22 so that images received at the third camera 28 are relayed to the video recording device 18.

Alternatively, four different signals may be sent to the motion detector port 118. Depending upon the signal, one of the video input ports 104, 106, 108, 110 is electrically connected to the input port 128 of the video recording device 18 depending upon the location of the detector that detected something moving about the vehicle. For example, if someone were trying to climb in a window on the driver's side of the vehicle, then the detector 26 on that side of the vehicle would detect the motion or heat and the video recording system 10 would automatically activate. A signal then is transmitted to the video signal relay device 22, more specifically to the motion detector port 118 and an appropriate relay connection is established between the camera positioned proximate the detector and the video recording device 18. In this way, any vandal or possible intruder will be video taped.

If two or more detectors are triggered simultaneously, no confusion occurs in the system as a hierarchy is established which prioritizes each detector and connects the video output port of the video camera proximate the detector of highest priority which has detected some movement. Preferably, the detector located on the side of the vehicle opposite the driver is the highest priority as this is where most vandals will attempt to enter the vehicle. The driver's side detector is second in rank followed by the interior detector and then the rear detector.

Additionally, the video signal relay device 22 includes a radio frequency transmitter/receiver. If a signal is received at the motion detector port 118 then the video signal relay device 22 transmits a signal to the RF receivers of other video signal relay devices located on adjacent vehicles. The video recording systems on these vehicles are activated just as if one of their detectors had detected some motion.

In this way a fleet of vehicles can be highly protected. For if someone attempts to vandalized or break into one vehicle, he may be video taped by many adjacent vehicles as well. Essentially, a protection network is established between proximate vehicles. This is especially useful for school buses and fleet vehicles as they are generally parked proximate one another.

Although the video recording system 10 of the present invention is intended primarily to video record passengers and motorists passing the vehicle, another function of the system is to decrease the number of areas generally unviewable by the driver. More specifically, areas referred to as the blind spots of the vehicle.

This is accomplished through the monitor 34 and the turn signal port 120. When the turn signal system is activated by the driver by well-known means, a signal is transmitted to the turn signal port 120 of the video signal relay device 22.

In response to the signal sent to the turn signal port 120, the video signals from the camera on the same side of the vehicle as the turn signal indicator is relayed to the monitor 34 via the output plug 113. The video recording system 10 may simultaneously be video recording the video signals from another camera as well, as the second set of signals are sent to the monitor and not the video recorder.

Additionally, the system 10 may be implemented in a vehicle without the video recorder. As such, the system serves primarily as a means for displaying areas about the vehicle that are not normally viewable by the driver. As such, an additional circuit is supplied such that when a person puts the vehicle in "reverse", images received at the rear camera are automatically relayed to the display 34. It is well known to utilize the transmission of a vehicle as a switch and one skilled in the art is able to connect the rear camera to the display if the vehicle is placed in reverse.

Figure 8:
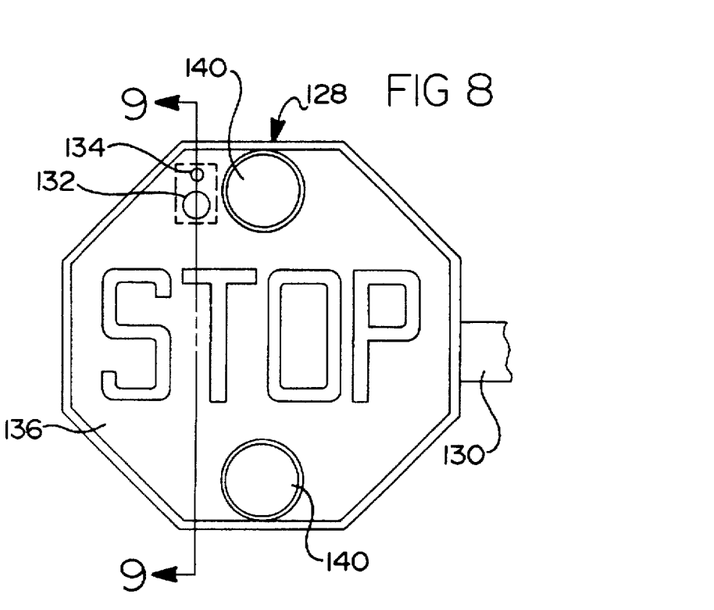
FIG. 8 is a view of an extendable stop sign having a video camera mounted thereon in accordance with the present invention.
Figure 9:
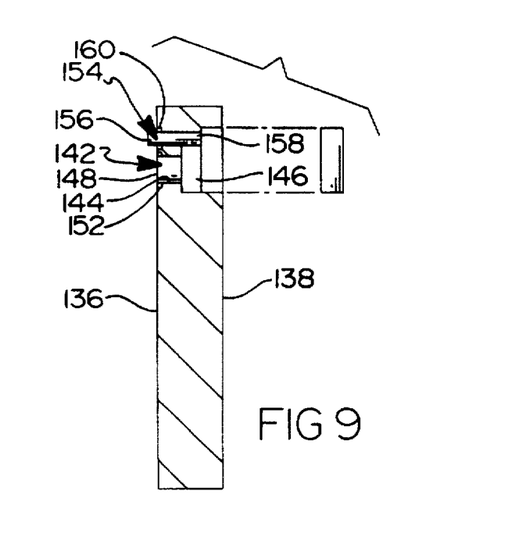
FIG. 9 is a cross-sectional view of the stop taken along the line 9—9 of FIG. 8.

Referring to FIGS. 8 and 9, a modification to the preferred embodiment provides a second camera 112 in an extendable and retractable stop sign 128 mounted to the vehicle 12 as opposed to directly on the vehicle. The extendable stop sign 128 is mounted to an arm 130 which is extensively mounted exteriorly the vehicle 12. Means for mounting the extendable stop sign 128 to the arm 130 includes brackets, screws or other means for mounting well-known to the skilled artisan. The extendable stop sign 128 has a retracted configuration where it is parallel and abutting the exterior of the school bus 12 and an extended configuration where it is substantially normal to and extended from the school bus 12. The extendable stop sign 128 may be extended and retracted by several means including electrically driven motors or manually operable spring loaded means, both of which are well known to the skilled artisan. The means for extending and retracting the extendable stop sign may be activated by the driver by pressing a button or by moving a handle, or thereby similar switching mechanisms (not shown). As shown, the sign 128 has a first aperture 132, a second aperture 134 located above the first aperture, a front surface 136, a rear surface 138 and two flashing stop lights 140.

The second video camera 142 has a front portion 144 and a rear portion 146. The front portion 144 includes a camera lens 148. The rear portion includes means for generating video signals representing an image received through the lens. Such means are well known to the skilled artisan. Additionally, the rear portion 146 includes a means for outputting video signals 150. Such means for outputting video signals are well known to the skilled artisan.

The front portion 144 of the second video camera 142 slidably fits into the first aperture 132 formed through the extendable stop sign 128. The lens 148 of the second video camera 142 lies flush oath the front surface 136 of the extendable stop sign 128 protecting the lens 148 from debris. A gasket 152 snugly fits about the front portion 144 of the second video camera 142 and seals the opening between the first aperture 132 of the extendable stop sign 128 and the periphery of the front portion 144 of the second video camera 142 which helps stabilize the front portion 144 of the second video camera 144 as the vehicle 12 passes over different types of terrain. The lens 148 of the second video camera 142 is trained on an area exterior the vehicle 12 where traffic approaches and passes the vehicle 12 generally on the driver's side thereof.

A second light emitting diode 154 includes a front portion 156 and a rear portion 158. The second light emitting diode 154 is mounted to the extendable stop sign 128 via a mounting bracket, glue or other well known mounting means and, further, is slidably housed within the second aperture 134 of the extendable stop sign 128. A gasket 160 snugly fits about the periphery of the second light emitting diode 154. The gasket 160 seals the opening between the second aperture 134 of the extendable stop sign 128 and the periphery of the second light emitting diode 154. The gasket 160 further provides vibration dampening for the second light emitting diode 154 extending the life thereof.

The second light emitting diode 154 is electrically connected to the second video camera 142 so that the second light emitting diode 154 is lit whenever the second video camera 142 is operating. Such means for electrically connecting a video camera to a light emitting diode are well known to the skilled artisan and include cabling, wires or other known electrical connection means.

The second video camera 142 in this alternative placement thereof is still connected to the power supply and the video signal relay device 22 via the connections set out herein above.

Accordingly, the present invention provides a cost effective way to video record passengers within a vehicle and approaching and passing vehicles. This system can be implemented in any vehicle, but has special application in passenger vehicles such as buses, and more specifically, school buses. The present invention additionally provides recording means to capture students breaking school rules while on the school bus.

The present invention serves not only to video tape students acting inappropriately and motorists breaking the law, it is a cost effective means for deterring such behavior. The present system also improves the ability of the driver of the vehicle to see areas adjacent the vehicle which were heretofore unviewable. Additionally, the system of the present invention provides protection against thieves and vandals.

As will be realized, the invention is capable of other and different embodiments and its several details are capable of modifications in various obvious respects, all without departing from the invention. Accordingly, the drawings and descriptions are to be regarded as illustrative in nature and not as restrictive.

Having, thus, described the present invention, what is claimed is:

1. A vehicle video recording system comprising;
   (a) a plurality of video cameras attached to a vehicle having an exterior and an interior, each of the plurality of video cameras comprising:
      (i) a lens;
      (ii) means for generating video signals representing an image received through the lens;
      (iii) means for outputting video signals;
   (b) a video recorder located Interiorly of the vehicle and having a video input port;
   (c) means for connecting the means for outputting video signals of each of the plurality of video cameras to the input port of the video recorder,
   the means for connecting comprising a video signal relay device which includes:

(i) a plurality of video signal input ports;
(ii) a video output plug;
(iii) a display output plug;
(iv) a plurality of switch ports;
(v) a transmitter and a receiver for remotely activating the vehicle video system in adjacent vehicles; and wherein video signals received at the plurality of video signal input ports are selectively relayed to the video output plug and the display output plug dependent upon signals received at each of the plurality of switch ports.

2. The vehicle video system of claim 1 wherein the plurality of switch ports comprises:

a) a switching signal input port;
b) a motion detector switch port;
c) a turn signal switch port; and
d) an override switch port.

3. The vehicle video system of claim 1 further comprising a plurality of motion detectors configured to activate the vehicle video system upon detection of movement proximate a vehicle.

4. The vehicle video system of claim 1 further comprising a monitor mounted interior the vehicle in electrical communication with the video output plug.

5. A vehicle video recording system comprising:

(a) a plurality of video cameras attached to a vehicle having an exterior and an interior, each of the plurality of video cameras comprising:
(i) a lens;
(ii) means for generating video signals representing an image received through the lens,
(iii) means for outputting video signals;

(b) a video recorder located interiorly of the vehicle and having a video Input port;

(c) a video signal relay device in electrical communication with and disposed intermediate the means for outputting video signals of each of the plurality of video cameras and the video input port of the video recorder, the video signal relay device comprising:
(i) a plurality of video signal input ports, each of the plurality of video signal input ports in electrical communication with the means for outputting video signals of a corresponding one of the plurality of video cameras;
(ii) a video output plug in electrical communication with the video input port of the video recorder;
(iii) a plurality of switch ports;
(iv) a transmitter and a receiver for remotely activating the vehicle video system in adjacent vehicles; and wherein video signals received at each of the plurality of video signal input ports are selectively relayed to the video output plug depending upon switching signals received at each of the plurality of ports.

6. A vehicle detection system for detecting an event occurring about a vehicle, the vehicle including a battery, the system comprising;

(a) a plurality of means for detecting an event about a vehicle;

(b) means for transmitting a signal associated with each means of detecting;

(c) a video signal relay device operatively connected to each of the means for transmitting a signal, the relay device comprising:
(i) means for relaying a video signal to a monitor, and
(ii) a transmitter and a receiver for remotely activating the vehicle video system in adjacent vehicles;

(d) a monitor for displaying a video signal transmitted thereto by the video signal relay device; and (e) means for providing electric power to the system, the means connected to the battery of the vehicle so that power is continually supplied to the system.

7. The system of claim 6 wherein:
at least one of the means for detecting comprises at least one motion detector.

8. The system of claim 7 wherein:
at least one of the means for detecting comprises a video camera.

9. The system of claim 7 which further comprises:
a video recorder operatively connected to the video signal relay device;

means for outputting a first signal from the video signal relay device to the video recorder, and;

means for outputting a second signal from the video signal relay device to the monitor.

10. The system of claim 9 which further comprises:

(a) a turn signal indicator disposed on the vehicle and including means for transmitting a signal to the relay device in response to the actuation of the turn signal; and (b) means for transmitting a signal from a means for detecting disposed proximate the turn signal to the monitor through the signal relay device.

11. The system of claim 10 wherein:
at least one of the plurality of means for detecting is disposed proximate the turn signal, the at least one of the plurality being a video camera.

* * * * *